United States Patent Office 2,811,548
Patented Oct. 29, 1957

2,811,548

METHOD OF PURIFYING AROMATIC DICARBOXYLIC ACIDS

George E. Ham and Arthur B. Beindorff, Decatur, Ala., assignors to The Chemstrand Corporation, Decatur, Ala., a corporation of Delaware No Drawing. Application July 30, 1954,
Serial No. 446,961

16 Claims. (Cl. 260—525)

This invention relates to a new method for purifying aromatic dicarboylic acids. More particularly, the invention is concerned with a new method for purifying aromatic dicarboxylic acids by means of recrystallization solvents, said acids being those which may be employed in the manufacture of fiber- and filament-forming polyesters and copolyesters.

In recent years various aromatic dicarboxylic acids, such as terephthalic acid, p-carboxyphenylacetic acid, p,p'-dicarboxybiphenyl, p,p'-dicarboxythiocarbanilide, etc. have increased considerably in commercial importance in view of the fact that these acids, when in a pure state, are capable of entering into a condensation polymerization reaction with various glycols, such as ethylene glycol, and the like, to form compositions which in turn are capable of being formed into fibers and filaments. The filaments thus produced, are capable of being cold-drawn and have many commercial applications.

In order to form condensation polymerization products or polyesters which are capable of producing fibers and filaments which in turn are capable of being cold drawn, it has been found that the dibasic acids employed must be in a pure state in order to achieve the sought for desirable properties. However, due to insolubility of most of the dibasic acids in common solvents, it has been difficult to effect purification of the acids by normal recrystallization procedures. For example, terephthalic acid, which is the acid most frequently employed in condensation polymerization reactions, usually contains varying amounts of p-toluic acid, and also isophthalic acid, residual catalyst, and colored oxidation products, which are exceedingly difficult to separate therefrom. For example, the similarity between terephthalic acid and p-toluic acid, with respect to chemical and physical properties make them difficult to separate by conventional methods. The high boiling points and slight solubility of the two acids make physical separations difficult. Chemical methods of purification of the aromatic dibasic acids which have been employed heretofore have not been entirely satisfactory due principally to economic reasons.

Various procedures which have been proposed for the purification of aromatic dicarboxylic acids suitable for condensation polymerizations to produce fiber- and filament-forming materials, have involved conversion of the acid to an ester and since the esters may be distilled with little decomposition and have a much wider range of solubility, they are much more easily purified than the acid. For example, one method of separating terephthalic acid from p-toluic acid and isophthalic acid involves forming the alkyl esters of the acids, fractionating the esters and saponifying the ester fractions. Ordinarily the dimethyl esters are used to effect separation in this manner. However, these methods of ester conversion are expensive on a commercial scale because of requirement of stainless steel pressure equipment, low equipment capacity, etc.

Therefore, there has been a great desire in the art to find other means for the purification of aromatic dicarboxylic acids, which are suitable for condensation polymerizations, which methods are simpler in their operation and more beneficial from an economic standpoint.

Accordingly, it is a primary object of the present invention to provide a new method for purifying aromatic dicarboxylic acids which overcomes the difficulties heretofore encountered in employing prior art procedures, said acids being those suitable for condensation polymerizations from the products of which, fibers and filaments can be formed which are capable of being cold-drawn. Other objects and advantages of the instant invention will in part appear and will in part be apparent from the description thereof hereinafter.

It has unexpectedly been found that N,N-dimethylformamide (DMF) and N,N-dimethylacetamide (DMA) are solvents for various aromatic dicarboxylic acids useful in condensation polymerizations, at elevated temperatures. It has further been found that these aromatic dicarboxylic acids, defined more specifically hereinafter, can be obtained in a highly pure state by recrystallizing them from DMF and DMA or mixtures of DMF or DMA with a non-solvent for the acids, such as water or methyl alcohol.

Accordingly, the objects of the present invention are in general accomplished by dissolving the crude aromatic dicarboxylic acid in N,N-dimethylformamide or N,N-dimethylacetamide or a mixture of either solvent with water or methanol at elevated temperatures and thereafter cooling the solution to crystallize the purified acid. When a recrystallization solvent mixture is employed, such as N,N-dimethylformamide or N,N-dimethylacetamide and water, the mixture will preferably contain from 1 to 30 percent of water and from 99 to 70 percent of N,N--dimethylformamide or N,N-dimethylacetamide. When methanol is employed in place of the water, the recrystallization solvent mixture will preferably contain from 1 to 40 percent methanol and from 99 to 60 percent of N,N-dimethylformamide or N,N-dimethylacetamide. All percentages given herein are by weight, unless otherwise indicated.

While the end result, namely, purification of the aromatic dibasic acid, is the same in all instances in the practice of the present invention, the mechanism by which such result is obtained will vary. For example, when employing N,N-dimethylformamide the pure aromatic dibasic acid per se is precipitated upon cooling the solution, irrespective of whether N,N-dimethylformamide is used alone or in combination with water or methanol, as pointed out hereinbefore. However, when employing N,N-dimethylacetamide the situation differs slightly. When N,N-dimethylacetamide is employed, either alone or in admixture with up to 20 percent of water or methanol, a dibasic acid-dimethylacetamide complex is formed which is precipitated as a crystalline solid upon cooling the solution. Thereafter the complex is separated by filtration and washed with water or methanol, preferably hot, to regenerate the purified dibasic acid. When the amount of water or methanol employed with N,N-dimethylacetamide in the recrystallization solvent mixture exceeds 20 percent, the pure aromatic dibasic acid per se is precipitated upon cooling the solution, thus eliminating the washing step to regenerate the acid. Of course, normal washing of the pricipated and filtered acid with a non-solvent therefor may be employed to remove the recrystallization solvent therefrom prior to drying.

It has been found that the N,N-dimethylacetamide-dibasic acid complex has a composition of 2 moles of N,N-dimethylacetamide for each mole of dibasic acid. This has been found to be true in the case of all the aromatic dibasic acids described herein.

Irrespective of the percentage of water or methanol employed, however, one obtains the purified aromatic dibasic acid when practicing the instant invention.

The aromatic dicarboxylic acids which may be purified in accordance with the present invention are those having the general formula:

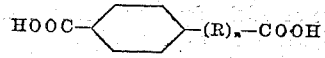

wherein $n$ is an integer from zero to one, inclusive, and R is a radical selected from the group of

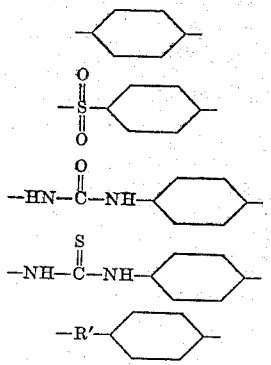

where R' is an alkyl group containing from 1 to 8 carbon atoms;

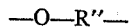

where R'' is an alkyl group containing from 1 to 6 carbon atoms, and

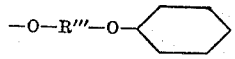

where R''' is an alkyl group containing from 1 to 6 carbon atoms. As examples of suitable aromatic dibasic acids having the above general formula there may be named:

Terephthalic acid
p,p'-Dicarboxybiphenyl
p,p'-Dicarboxycarbanilide
p,p'-Dicarboxythiocarbanilide
p,p'-Dicarboxydiphenylsulfone
p-Carboxyphenoxyacetic acid
p-Carboxyphenoxypropionic acid
p-Carboxyphenoxybutyric acid
p-Carboxyphenoxyvaleric acid
p-Carboxyphenoxyhexanoic acid
p-Carboxyphenoxyheptanoic acid
p,p'-Dicarboxydiphenylmethane
p,p'-Dicarboxydiphenylethane
p,p'-Dicarboxydiphenylpropane
p,p'-Dicarboxydiphenylbutane
p,p'-Dicarboxydiphenylpentane
p,p'-Dicarboxydiphenylhexane
p,p'-Dicarboxydiphenylheptane
p,p'-Dicarboxydiphenyloctane
p,p'-Dicarboxydiphenoxymethane
p,p'-Dicarboxydiphenoxyethane
p,p'-Dicarboxydiphenoxypropane
p,p'-Dicarboxydiphenoxybutane
p,p'-Dicarboxydiphenoxypentane
p,p'-Dicarboxydiphenoxyhexane The aromatic dicarboxylic acid to be purified is dissolved in the selected recrystallization solvent or solvent mixture, when water or methanol is employed, at elevated temperatures, i. e., the mixture is heated until solution occurs. The temperature at which complete solution takes place will depend upon (1) whether DMF or DMA is being used; (2) the particular acid being purified; or (3) whether a mixture of DMF or DMA with water or methanol is being employed. Normally, a temperature within the range of 50° C. to 150° C. is sufficient to bring about complete solution of the acids listed hereinbefore. Upon cooling the solution to a temperature in the range of 0° C. to 45° C., the purified acid or the purified complex of the aromatic dicarboxylic acid-dimethylacetamide is precipitated. The purified acid is recovered by filtration and in the case of the complex, the same is washed with water or methanol to regenerate the purified dibasic acid. The complex may be washed with cold DMF or DMA which removes impurities and thereafter washed with water or methanol to regenerate the purified dibasic acid.

Very often the particular aromatic dicarboxylic acid to be purified may contain some existing and undesirable color which must be removed to prevent the color from appearing in the fibers and/or filaments prepared from the polyesters formed from the purified aromatic dicarboxylic acid. The color can easily be removed by employing activated carbon in the recrystallization solvent or solvent mixture. Usually from 0.1 to 5 parts by weight of activated carbon, based on the weight of the recrystallization solvent or solvent mixture, is sufficient.

When employing the process of the present invention, the yield is approximately 80 to 95 percent of the weight of the crude or unpurified aromatic dicarboxylic acid and in those instances, where a product of highest purity is desired, it can be obtained by giving the purified aromatic dicarboxylic acid a second crystallization, and more, if desired.

In order to more clearly understand the process of the instant invention, reference should be had to the following specific examples which are merely intended to be illustrative and not limitative. In the examples, all parts and percents are by weight, unless otherwise indicated.

*Example I*

Fifteen grams of terephthalic acid was mixed with N,N-dimethylformamide at room temperature. The terephthalic acid amounted to 15% by weight of the mixture. The mixture was thereafter heated above 50° C. whereupon the acid dissolved. Upon cooling the solution the purified terephthalic acid precipitated and it was isolated by filtering and washing with cold DMF. Thereafter the terephthalic acid was washed with water and dried. The yield of purified acid was 91% by weight, based on the weight of the crude terephthalic acid. The purified acid was found to be particularly useful in the manufacture of polyesters of good color and high molecular weight.

*Example II*

It was found that N,N-dimethylacetamide and methanol mixtures could be employed to purify the aromatic dicarboxylic acids named herein, particularly mixtures containing 10-20% by volume of methanol. In this example 150 ml. methanol were added to 1700 ml. N,N-dimethylacetamide. The mixture was heated to boiling and 250 grams of crude or impure terephthalic acid were added thereto. When solution was complete, the solution was filtered through glass wool and then allowed to cool overnight at room temperature. Broad bulky needles precipitated, which, upon filtering and washing with DMA, were found to be a complex of terephthalic acid and N,N-dimethylacetamide. The complex was decomposed by washing the same with water to yield the precipitated acid which in turn was washed with water and dried. The yield of purified acid was 92% by weight based on the weight of the impure terephthalic acid.

No further precipitate was recovered from the original solvent when 300 mls. of additional methanol were added thereto. The purified terephthalic acid thus obtained was useful in making polyethylene terephthalate of good color and high molecular weight by direct reaction of the acid with ethylene glycol.

*Example III*

Crude p,p'-dicarboxythiocarbanilide (10 grams) was dissolved in a mixture of 70% dimethylacetamide and 30% water at a temperature of 100° C. 100 ml. of the solvent mixture was employed. Upon cooling to a temperature of 25° C. the purified acid crystallized. The purified acid was recovered by filtering, washing with methanol and drying. A yield of 85%, based on the weight of the crude acid, was obtained.

*Example IV*

Following the procedure of Example III, p,p'-dicarboxythiocarbanilide was purified from a mixture of 70% N,N-dimethylacetamide and 30% methanol with a yield of 87%, based on the weight of the crude acid.

*Example V*

A mixture of one gram of p-carboxyphenoxyacetic acid and 4 grams of N,N-dimethylacetamide was heated to 50° C. and then cooled. The acid stayed in solution. Thereafter, two volumes of water per volume of DMA were slowly added to the solution whereupon the free acid precipitated. After filtering and washing with hot water, a 90% yield, based on the weight of the crude acid, of pure p-carboxyphenoxyacetic acid was obtained.

*Example VI*

A mixture of one part of p,p'-dicarboxybiphenyl and 100 parts of N,N-dimethylacetamide was heated to 160° C. to effect solution. The solution was rapidly filtered and slowly cooled. Approximately 90% yield of the pure acid, based on the weight of the crude acid, was obtained on filtering the solid and washing the solid with hot water.

The present invention provides a simple and economic method for purifying the aromatic dicarboxylic acids which are useful in the manufacture of condensation polymerization products. The present method alleviates the difficulties encountered in prior chemical methods of purification. The present method is economical in that conventional equipment can be employed and no special expensive stainless steel pressure equipment is needed as in the case where the acids are converted to esters. After separation of the purified acid, the recrystallization solvent can be recovered by conventional distillation procedures, and the like, and reused, thus reducing the cost of the process. Numerous other advantages of the instant invention will be readily apparent to those skilled in the art.

It is to be understood that changes and variations may be made without departing from the spirit and scope of the invention as defined in the appended claims.

We claim:

1. A process for purifying aromatic discarboxylic acids having the formula:

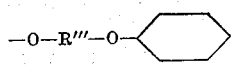

wherein *n* is an integer from zero to one, inclusive, and R is a radical selected from the group consisting of

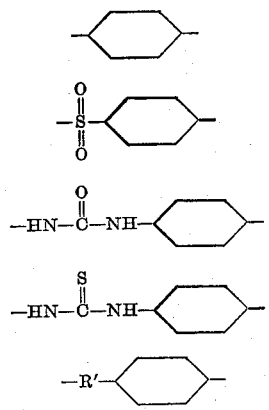

where R' is an alkyl group containing from 1 to 8 carbon atoms; —O—R"— where R" is an alkyl group containing from 1 to 6 carbon atoms; and

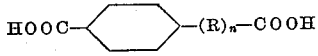

where R''' is an alkyl group containing from 1 to 6 carbon atoms, which comprises dissolving the acid in a recrystallization solvent selected from the group consisting of N,N-dimethylformamide, N,N-dimethylacetamide, mixtures of N,N-dimethylformamide and water, mixtures of N,N-dimethylacetamide and water, mixtures of N,N-dimethylformamide and methanol, and mixtures of N,N-dimethylacetamide and methanol, at a temperature in the range of 50° C. to 150° C., cooling the solution to form a crystalline product, and filtering to remove the crystalline product therefrom.

2. The process as defined in claim 1 wherein the aromatic dicarboxylic acid is terephthalic acid.

3. The process as defined in claim 1 wherein the aromatic dicarboxylic acid is p,p'-dicarboxythiocarbanilide.

4. The process as defined in claim 1 wherein the aromatic dicarboxylic acid is p,p'-dicarboxybiphenyl.

5. The process as defined in claim 1 wherein the aromatic dicarboxylic acid is p-carboxyphenoxyacetic acid.

6. The process as defined in claim 1 wherein the aromatic dicarboxylic acid is p,p'-dicarboxycarbanilide.

7. The process as defined in claim 1 wherein the recrystallization solvent is N,N-dimethylformamide.

8. The process as defined in claim 1 wherein the recrystallization solvent is N,N-dimethylacetamide.

9. The process as defined in claim 1 wherein the recrystallization solvent is a mixture of 1 to 30% water and 99 to 70% N,N-dimethylformamide.

10. The process as defined in claim 1 wherein the recrystallization solvent is a mixture of 1 to 40% methanol and 99 to 60% N,N-dimethylacetamide.

11. The process as defined in claim 1 wherein the recrystallization solvent is a mixture of 1 to 30% water and 99 to 70% N,N-dimethylacetamide.

12. The process as defined in claim 1 wherein from 0.1 to 5 parts of activated carbon are added to the hot solution with stirring and thereafter the hot solution is filtered to remove the carbon prior to cooling said solution.

13. A process for purifying aromatic dicarboxylic acids having the formula

wherein *n* is an integer from zero to one, inclusive, and R is a radical selected from the group consisting of

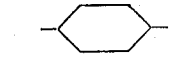

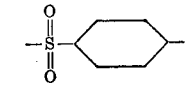

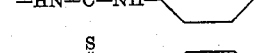

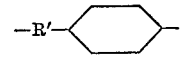

where R' is an alkyl group containing from 1 to 8 carbon atoms; —O—R"— where R" is an alkyl group containing from 1 to 6 carbon atoms; and

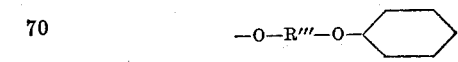

where R''' is an alkyl group containing from 1 to 6 carbon atoms, which comprises dissolving the acid in a recrystallization solvent comprising N,N-dimethylacetamide and not more than 20% of water at a temperature in the range of 50° C. to 150° C. to form the dicarboxylic acid-dimethylacetamide complex, cooling the solution to crystallize the complex, filtering to remove the complex therefrom, and washing the complex with water to regenerate the purified aromatic dicarboxylic acid.

14. A process for purifying aromatic dicarboxylic acids having the formula

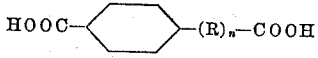

wherein $n$ is an integer from zero to one, inclusive, and R is a radical selected from the group consisting of

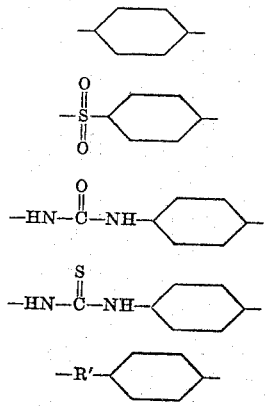

where R' is an alkyl group containing from 1 to 8 carbon atoms; —O—R"— where R" is an alkyl group containing from 1 to 6 carbon atoms; and

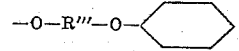

where R''' is an alkyl group containing from 1 to 6 carbon atoms, which comprises dissolving the acid in a recrystallization solvent comprising N,N-dimethylacetamide and not more than 20% of methanol at a temperature in the range of 50° C. to 150° C. to form the dicarboxylic acid-dimethylacetamide complex, cooling the solution to crystallize the complex, filtering to remove the complex therefrom, and washing the complex with water to regenerate the purified aromatic dicarboxylic acid.

15. The process as defined in claim 13 wherein from 0.1 to 5 parts of activated carbon are added to the hot solution with stirring and thereafter the hot solution is filtered to remove the carbon prior to cooling said solution.

16. The process as defined in claim 13 wherein the aromatic dicarboxylic acid is terephthalic acid.

References Cited in the file of this patent
UNITED STATES PATENTS

| | | |
|---|---|---|
| 2,664,440 | Toland | Dec. 29, 1953 |
| 2,732,399 | Carlston et al. | Jan. 24, 1956 |
| 2,742,496 | Lum et al. | Apr. 17, 1956 |

OTHER REFERENCES

Walker: J. of App. Chem., vol. 2 (1952), pp. 470, 474 and 476.